United States Patent
Yoshizawa et al.

(10) Patent No.: US 6,830,278 B2
(45) Date of Patent: Dec. 14, 2004

(54) VEHICLE OCCUPANT PROTECTION APPARATUS

(75) Inventors: Ryozo Yoshizawa, Wako (JP); Isamu Nakanishi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/439,042

(22) Filed: May 14, 2003

(65) Prior Publication Data

US 2003/0227199 A1 Dec. 11, 2003

(30) Foreign Application Priority Data

Jun. 6, 2002 (JP) .......................................... 2002-166083

(51) Int. Cl.$^7$ .............................................. B60N 2/02
(52) U.S. Cl. .............................. 296/68.1; 297/216.12; 297/216.13; 701/45
(58) Field of Search ...................... 296/68.1; 297/408, 297/391, 410, 216.12, 216.13, 216.14, 216.1, 404, 397, 220, 406, 216.19; 280/735, 753; 180/282, 271; 701/45, 49

(56) References Cited

U.S. PATENT DOCUMENTS

| | | | | |
|---|---|---|---|---|
| 3,592,508 A | * | 7/1971 | Druseikis | 297/380 |
| 4,586,848 A | * | 5/1986 | Esplin | 405/60.5 |
| 5,288,129 A | * | 2/1994 | Nemoto | 297/410 |
| 5,378,043 A | * | 1/1995 | Viano et al. | 297/216.12 |
| 5,684,701 A | | 11/1997 | Breed | |
| 5,694,320 A | * | 12/1997 | Breed | 701/45 |
| 5,882,071 A | * | 3/1999 | Fohl | 297/216.12 |
| 5,934,750 A | * | 8/1999 | Fohl | 297/216.12 |
| 6,019,424 A | * | 2/2000 | Ruckert et al. | 297/216.12 |
| 6,024,406 A | * | 2/2000 | Charras et al. | 297/216.13 |
| 6,088,640 A | * | 7/2000 | Breed | 701/45 |
| 6,196,580 B1 | | 3/2001 | Eberle et al. | |
| 6,331,014 B1 | * | 12/2001 | Breed | 297/216.12 |
| 6,520,577 B2 | * | 2/2003 | Kitagawa | 297/216.13 |
| 6,607,242 B2 | * | 8/2003 | Estrada et al. | 297/216.12 |
| 6,609,053 B1 | * | 8/2003 | Breed | 701/45 |
| 2003/0015898 A1 | * | 1/2003 | Breed | 297/216.12 |
| 2004/0000807 A1 | * | 1/2004 | Pal et al. | 297/391 |
| 2004/0012234 A1 | * | 1/2004 | Yamaguchi et al. | 297/216.12 |

FOREIGN PATENT DOCUMENTS

JP        200-6751      1/2000

\* cited by examiner

*Primary Examiner*—Kiran Patel
(74) *Attorney, Agent, or Firm*—Merchant & Gould P.C.

(57) ABSTRACT

A vehicle occupant protection apparatus includes a headrest control unit for drive-controlling a headrest actuating mechanism. This control unit itself predicts that a vehicle behind is about to impact its own vehicle, and controls the headrest actuating mechanism to move a seat headrest forward and thereby reduce the size of the gap between the headrest and the neck of the occupant of the seat.

3 Claims, 14 Drawing Sheets

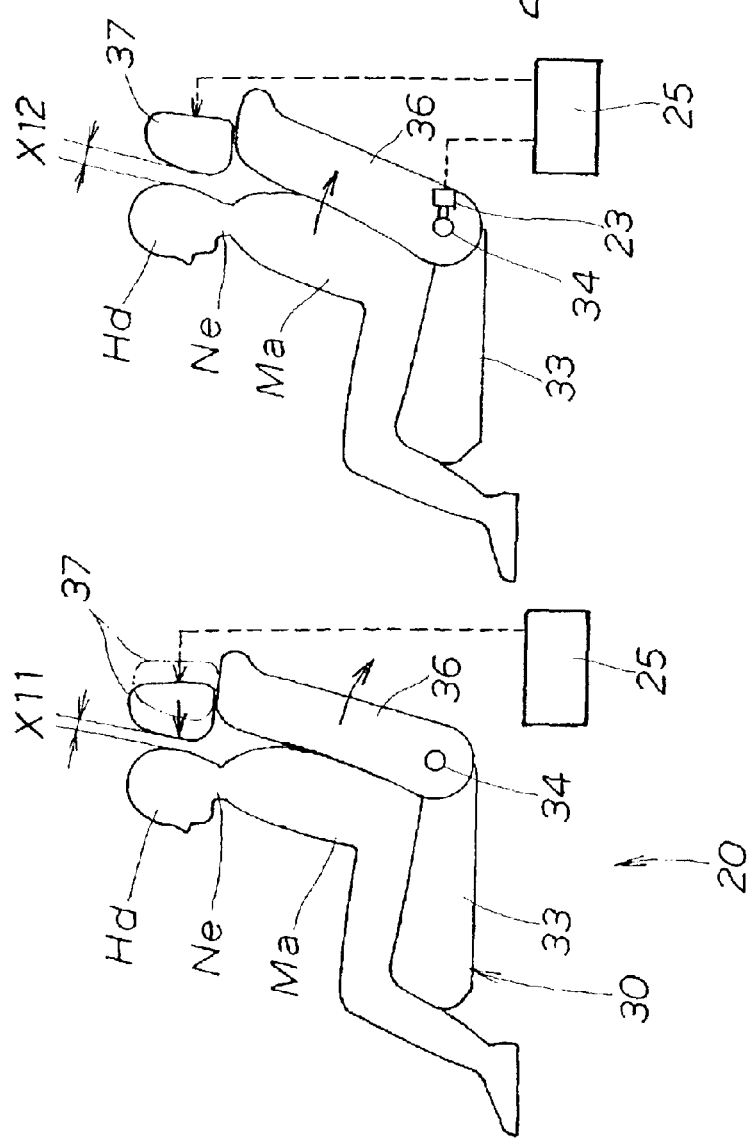

VEHICLE OCCUPANT PROTECTION APPARATUS

FIELD OF THE INVENTION

This invention relates to a vehicle occupant protection apparatus for protecting the neck of an occupant seated in a vehicle seat.

BACKGROUND OF THE INVENTION

Normally, between the headrest at the top of a vehicle seat and the neck of an occupant seated in the seat, there is a so-called behind-the-neck gap. When a vehicle is impacted from behind by an impacting body (hereinafter called a "rear-end collision"), as a reaction to this the upper body of the occupant falls backward. And the larger is the behind-the-neck gap, the greater is the load which acts on the neck of the occupant.

As technology for lightening the load on the neck, there has been that in which the cushioning capacity of the seat back is raised. When the upper body of the occupant falls backward, because a seat back with a large cushioning effect compresses greatly, the behind-the-neck gap decreases and the load on the neck is lightened. However, when the cushioning effect of the seat back is too large, ride comfort may decrease. To avoid this, technology aiming to achieve both ride comfort and protection has been developed, as shown in FIG. 13 and FIG. 14A through 14C.

An occupant protection apparatus shown in FIG. 13 has a headrest 103 mounted swingably front/rearward by way of a swinging mechanism 102 to the top of a seat back 101 of a seat 100.

When as a reaction to the vehicle suffering a rear-end collision the upper body of an occupant 104 falls rearward, an external force W1 acts on the seat back 101 from the upper body. The swinging mechanism 102 swings under this external force W1, and the headrest 103 consequently advances from a normal position shown with broken lines to the position shown with solid lines. And by a behind-the-neck gap 105 between the neck of the occupant and the headrest 103 becoming small in this way, the load on the neck is lightened.

A seat 200 provided with an occupant protection apparatus shown in FIG. 14A has a seat cushion 201, a hinge mechanism 202, a seat back 203 attached swingably front/rearward to the seat cushion 201 by way of this hinge mechanism 202, and a headrest 204 attached to the top of the seat back 203.

The hinge mechanism 202 is made up of a fixed plate 211 attached to the rear end of the seat cushion 201, a first swing arm 214 attached swingably up/downward to the fixed plate 211 by way of a first link 212 and a second link 213, and a second swing arm 215 attached swingably front/rearward to the first swing arm 214. The seat back 203 is attached to the distal end of the second swing arm 215. The swing angles of the first swing arm 214 and the second swing arm 215 correspond to size of an external force.

From the state shown in FIG. 14A, the first swing arm 214 and the second swing arm 215 will swing counter-clockwise in the figure under the impact force of a rear-end collision. As a result, because the seat back 203 temporarily moves toward the upright, as shown in FIG. 14B, a behind-the-neck gap 221 decreases. After that, due to the upper body of an occupant 222 falling rearward as a reaction to the rear-end collision, an external force acts on the seat back 203 from the upper body. And under this external force, as shown in FIG. 14C, the seat back 203 and the second swing arm 215 fall rearward. As a result, the impact acting on the occupant 222 is absorbed by the seat back 203, and the behind-the-neck gap 221 decreases further. In this way it is possible to make the behind-the-neck gap 221 small and moderate the impact which acts on the neck.

However, the two related art technologies described above, as shown in FIG. 13 and FIGS. 14A through 14C, are passive vehicle occupant protection apparatus, which commence operation when an external force acting at the time of rear-end collision reaches a preset fixed reference value.

Consequently, when the reference value for operation commencement is too large, in the case of a light collision with a small impact energy, the vehicle occupant protection apparatus cannot operate. And, when the upper body of an occupant falls rearward as a reaction to a rear-end collision, the external force which acts on the seat back from the upper body varies depending on the weight of the occupant. When the occupant of the seat is light, the reference value for actuation commencement may not be reached.

When on the other hand the reference value for operation commencement is too small, there is a risk that the vehicle occupant protection apparatus may operate even in the normal state, when there has been no rear-end collision. Thus, there is room for improvement in the protection apparatus of related art described above. That is, there is a need to more certainly lighten the load on the neck of an occupant seated in a vehicle seat when the vehicle is collided with by an impacting body from behind (suffers a rear-end collision).

SUMMARY OF THE INVENTION

The present invention provides a vehicle occupant protection apparatus including a headrest mounted movably front/rearward to the top of a vehicle seat, a headrest actuating mechanism for moving the headrest forward, and a headrest control unit for drive-controlling the headrest actuating mechanism, wherein the headrest control unit includes impact predicting means for predicting the impact of an impacting body on the vehicle from behind and drive-controls the headrest actuating mechanism on the basis of a prediction signal from this impact predicting means.

That is, an active vehicle occupant protection apparatus can be constructed which controls the operation of a headrest actuating mechanism to commence on the basis of predicting itself that an impacting body is about to impact the vehicle from behind. Accordingly, when a rear-end collision is predicted by the impact predicting means, in correspondence with a prediction signal outputted from the impact predicting means, a control signal is issued to the headrest actuating mechanism from the headrest control unit, and the headrest is moved forward by the headrest actuating mechanism. Consequently, at the rear-end collision prediction stage, the gap between the headrest at the top of the seat and the neck of the occupant seated in the seat is forcibly reduced in advance. And by the behind-the-neck gap being reduced like this immediately before the rear-end collision, the load acting on the neck of the occupant when the upper body of the occupant falls rearward as a reaction to the rear-end collision can be more certainly lightened.

Preferably, the impact predicting means includes relative speed detecting means for detecting the relative speed of the impacting body with respect to the vehicle and the headrest control unit controls the headrest actuating mechanism to increase the amount of forward movement of the headrest in correspondence with a detection signal from the relative speed detecting means. In this case, when an impact is predicted by the impact predicting means, in correspondence with the relative speed of the impacting body with respect to the vehicle, the amount of forward movement of the headrest can be varied more suitably. When there has been a rear-end collision, as a reaction to this the upper body of the occupant tends to fall rearward. The amount of this falling is larger the larger is the relative speed. In this invention, the larger is the relative speed, the more the amount of forward movement of the headrest is increased. Consequently it is possible to make the behind-the-neck gap smaller immediately before the impact, and the load acting on the neck of the occupant when as a reaction to the rear-end collision the upper body of the occupant falls rearward can be rapidly and certainly lightened.

Preferably the seat in this invention has a seat back deformation detector for detecting deformation of a seat back deforming in accordance with the size of a rearward external force acting on the seat back, and the headrest control unit controls the headrest actuating mechanism to increase the amount of forward movement of the headrest in correspondence with a detection signal from the seat back deformation detector. That is, when there has been a rear-end collision, as a reaction thereof the upper body and the head of the occupant fall rearward. Because the upper body is supported by the seat back, the amount by which it falls is relatively small. On the other hand, immediately before the rear-end collision the head is away from the headrest. Consequently, the amount by which the head falls is greater than the amount by which the upper body falls. This tendency is more marked the greater is the impact energy.

As a result of the upper body of the occupant falling rearward as a reaction to a rear-end collision like this, an external force acts on the seat back from the upper body. In correspondence with this external force the seat back deforms. The greater is the impact energy the greater is the external force, and consequently the greater is the deformation of the seat back. In this invention, the greater is the deformation of the seat back, the more the amount of forward movement of the headrest is increased. Because of this, the behind-the-neck gap can be made smaller at the time of a rear-end collision. Consequently, when the upper body of the occupant falls rearward as a reaction to a rear-end collision, the load acting on the neck of the occupant can be lightened more rapidly and certainly.

Also, preferably, the headrest actuating mechanism of this invention has a headrest actual forward movement detector for detecting the actual forward movement of the headrest, and the headrest control unit controls the headrest actuating mechanism to reduce the speed of forward movement of the headrest as the actual forward movement detected by the headrest actual forward movement detector increases. That is, as the headrest moves forward, as the behind-the-neck gap decreases, the headrest slows as it moves forward. And accordingly, even if the advancing headrest hits the neck, the load which acts on the neck is extremely slight.

BRIEF DESCRIPTION OF THE DRAWINGS

Certain preferred embodiments of the present invention will now be described in detail, by way of example only, with reference to the accompanying drawings, in which:

FIGS. 7A through 7C are views showing the movement of a headrest when it has been predicted that the vehicle is about to undergo a rear-end collision and when it has undergone the rear-end collision;

DETAILED DESCRIPTION OF THE PREFERRED EMBODIMENTS

Figure 1:
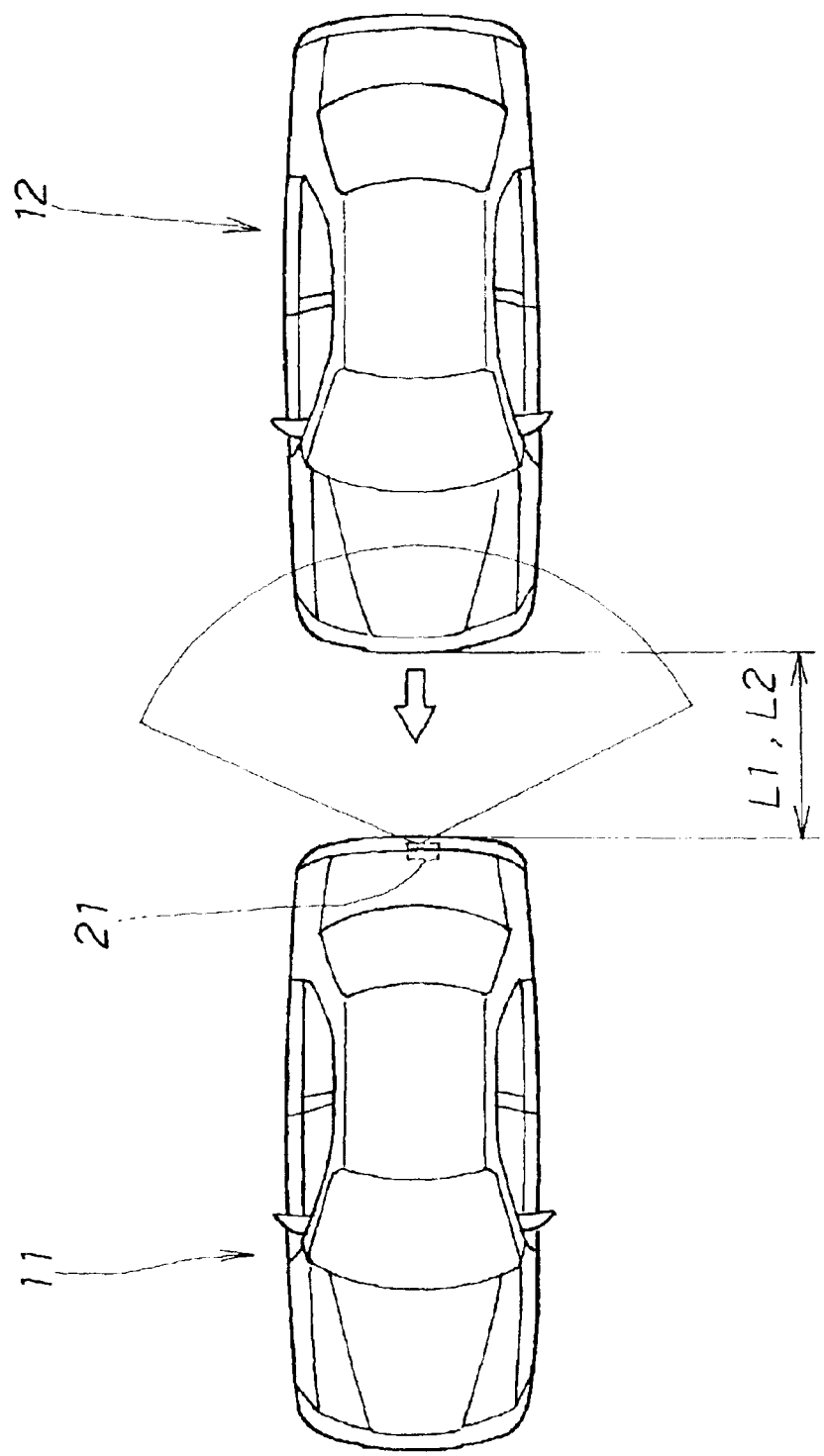
FIG. 1 is a plan view of a vehicle in front and a vehicle behind according to the invention.

A vehicle 11 shown in FIG. 1 has in the center of its rear end an inter-vehicle distance detector 21. This inter-vehicle distance detector 21 measures an inter-vehicle distance L1, L2 between its own vehicle (the own vehicle 11) and a vehicle behind (the vehicle behind 12), and for example may be an ultrasonic sensor, an infra-red sensor, an ultraviolet sensor, a visible light sensor, a laser sensor, a radar-type sensor, or a CCD or other image-pickup system (camera system).

Here, the vehicle behind 12 is defined as an impacting body impacting the vehicle 11 from behind.

Figure 2:
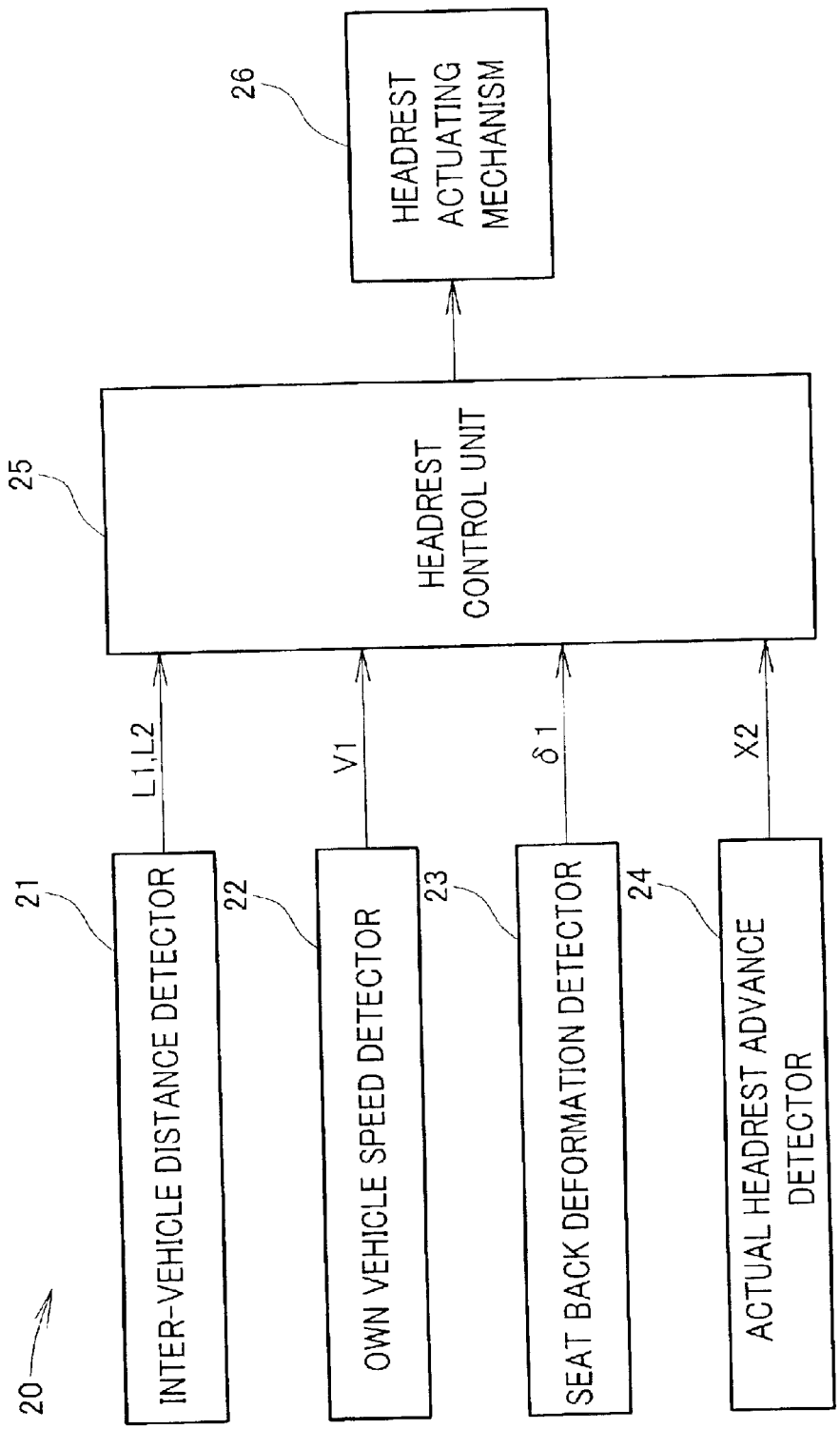
FIG. 2 is a block diagram of a vehicle occupant protection apparatus according to the invention.

A vehicle occupant protection apparatus 20 shown in FIG. 2 has the inter-vehicle distance detector 21, an own vehicle speed detector 22, a seat back deformation detector 23, an actual headrest advance detector 24, a headrest control unit 25, and a headrest actuating mechanism 26. The own vehicle speed detector 22 is a speed sensor. Details of the other devices 23 to 26 will be discussed later.

Figure 3:
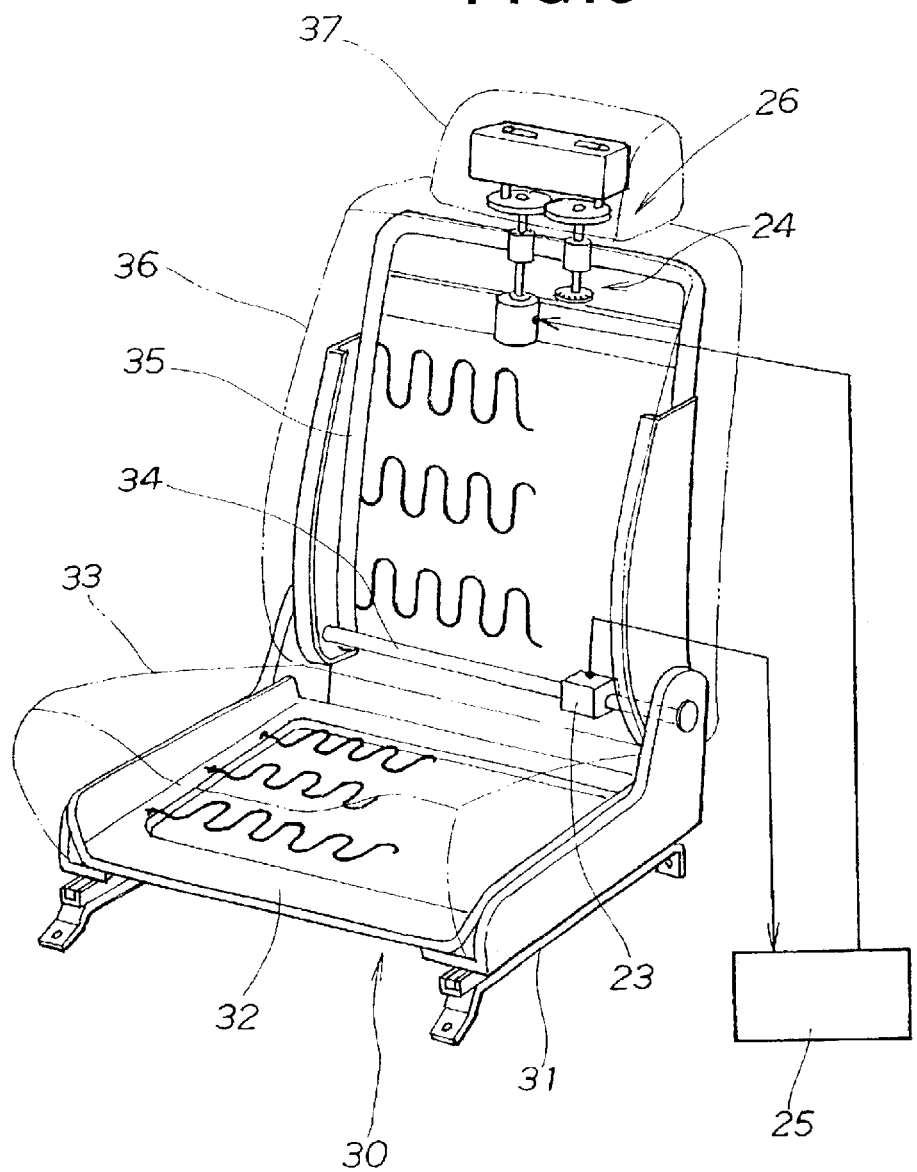
FIG. 3 is a perspective view of a vehicle seat according to the invention.

A vehicle seat 30 shown in FIG. 3 is made up of a seat mounting 31 fixed to the floor of the vehicle, a seat cushion 33 and a seat back 36 mounted to the seat mounting 31, and a headrest 37 mounted movably front/rearward to the top of the seat back 36.

In other words, the seat 30 is made by attaching the seat cushion 33 to the seat mounting 31 by way of a seat cushion frame 32; attaching a seat back frame 35 pivotally front/rearward to the seat mounting 31 by way of a hinge 34; attaching the seat back 36 to the seat back frame 35; and attaching the headrest 37 movably front/rearward to the top of the seat back frame 35 by way of the headrest actuating mechanism 26.

The seat 30 also has the above-mentioned seat back deformation detector 23 for detecting deformation of the seat back 36. When an external force acts rearward on the seat back 36, in correspondence with the size of the external force, deformations occur in the hinge 34 and the seat back 36. And by the deformation occurring in the hinge 34 being detected by the seat back deformation detector 23, the deformation of the seat back 36 is detected.

The headrest control unit 25 controls the headrest actuating mechanism 26 to increase the advance of the headrest 37 in correspondence with a detection signal from the seat back deformation detector 23.

Figure 4:
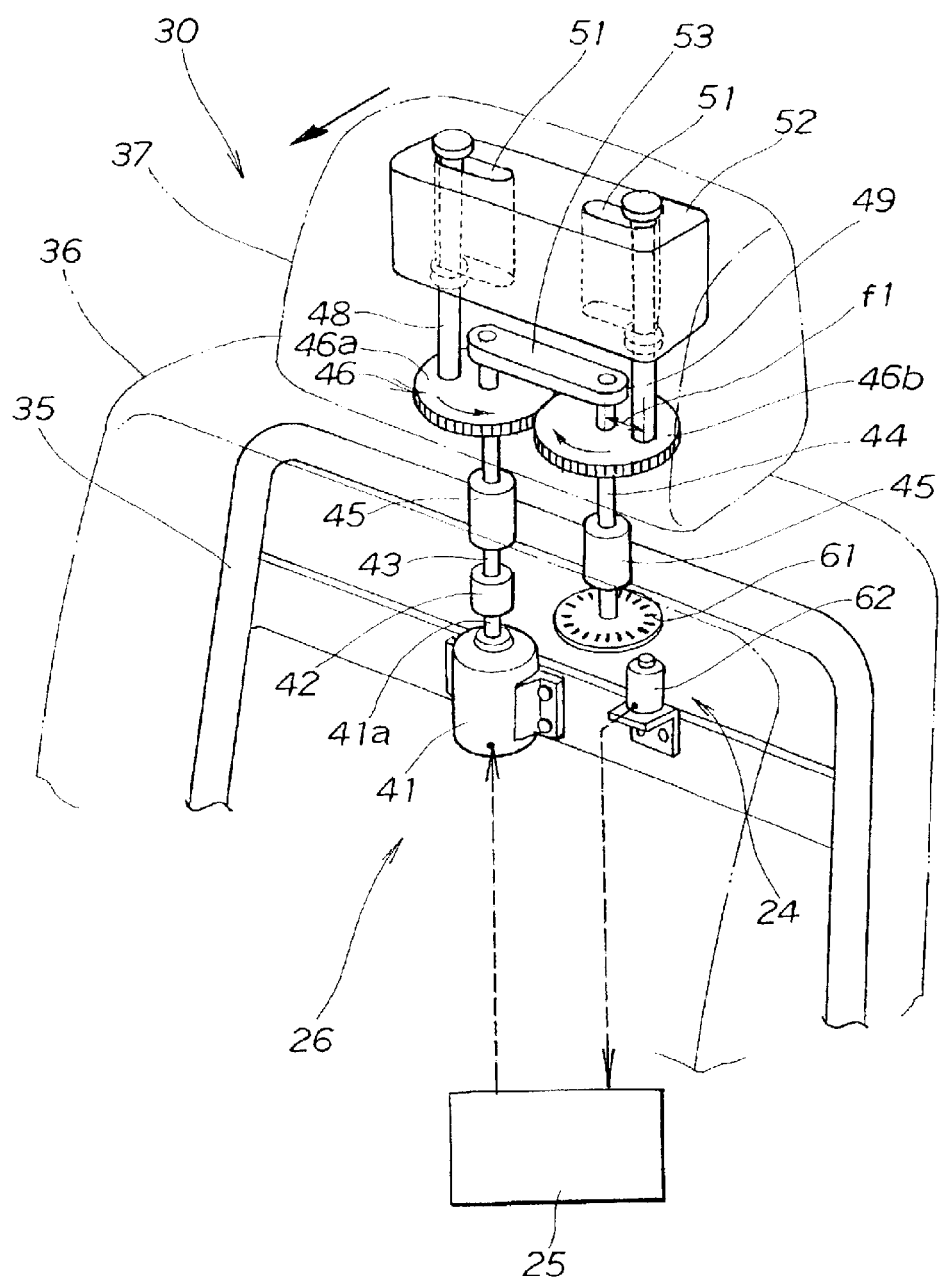
FIG. 4 is a perspective view of a headrest actuating mechanism shown in FIG. 3.

FIG. 4 shows the headrest 37 and the headrest actuating mechanism 26 according to the invention.

The headrest actuating mechanism 26 is made up of a motor 41 mounted with its motor shaft 41a pointing upward to an upper part of the seat back frame 35; a vertical driving shaft 43 connected to the motor shaft 41a by a coupling 42; a following shaft 44 disposed parallel with the driving shaft 43; bearings 45, 45 mounting the driving shaft 43 and the following shaft 44 to an upper part of the seat back frame 35, rotatably but restricting axial direction movement; a gear set 46 made up of a first gear wheel 46a and a second gear wheel 46b, each having the same number of teeth, for transmitting power from the driving shaft 43 to the following shaft 44; vertical first and second revolving drive shafts 48, 49 fixed to the gear wheels 46a, 46b in positions off-center by an eccentricity f1 from the respective centers of rotation; and a driven member 52 having slots 51, 51 in which the first and second revolving drive shafts 48, 49 fit. The driven member 52 is attached to the headrest 37.

The slots 51, 51 are holes which are long in the vehicle width direction and pass through the driven member 52 vertically. The first and second revolving drive shafts 48, 49 are attached to the headrest 37 by way of the driven member 52 so that axial direction movement is restricted. The reference numeral 53 denotes a bearing member.

Power from the motor 41 is transmitted from the motor shaft 41a via the coupling 42, the driving shaft 43 and the first gear wheel 46a to the first revolving drive shaft 48. Simultaneously, power is transmitted from the first gear wheel 46a via the second gear wheel 46b to the second revolving drive shaft 49. By the first and second revolving drive shafts 48, 49 revolving, byway of the slots 51, 51 the driven member 52 is pushed forward and advances the headrest 37 (in the direction shown with an arrow).

The headrest actuating mechanism 26 also has an actual headrest advance detector 24 for detecting the present actual amount of forward movement (actual advance) of the headrest 37. The actual headrest advance detector 24 is for example a photoelectric rotary encoder made up of a pulse disc 61 attached to the bottom end of the following shaft 44 and a sensor 62 for detecting changes in the amount of light passing through the pulse disc 61.

The headrest control unit 25 controls the headrest actuating mechanism 26 to reduce the speed of advance of the headrest 37 as the actual advance detected by the actual headrest advance detector 24 increases.

FIG. 5A through FIG. 5D show movement states of a headrest and headrest advancing device according to the invention.

Figure 5A:
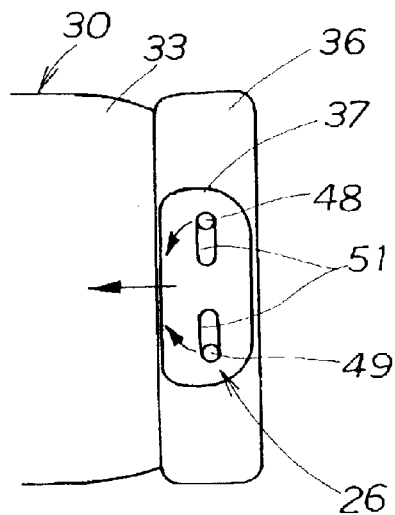
FIGS. 5A through 5D are plan views and side views showing the movement of a headrest with respect to a seat back shown in FIG. 3.
Figure 5C:
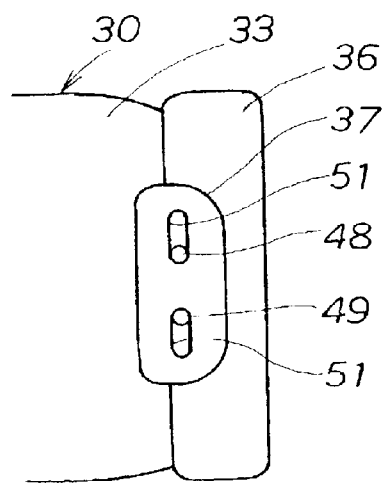
Figure 5B:
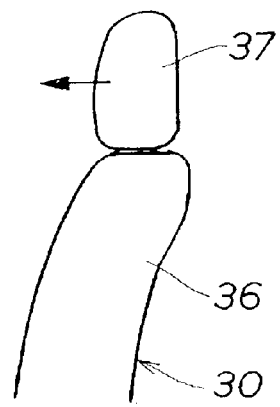

As shown in FIG. 5A and FIG. 5B, when the headrest 37 is at its most rearward with respect to the seat back 36, the first revolving drive shaft 48 and the second revolving drive shaft 49 are in outer positions in the slots 51, 51, which are long in the vehicle width direction.

After that, by the first revolving drive shaft 48 and the second revolving drive shaft 49 revolving forward, by way of the slots 51, 51 they push the headrest 37 forward. As a result, the headrest 37 advances to the state shown in FIG. 5C and FIG. 5D. The advance of the headrest 37, i.e. the actual advance, will be written X2.

Figure 5D:
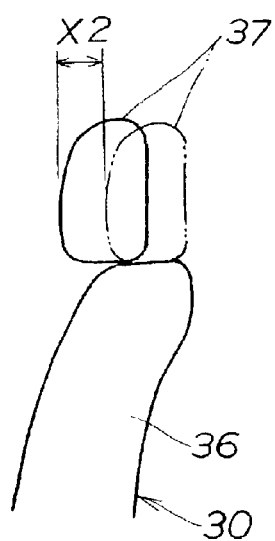

As shown in FIG. 5C and FIG. 5D, when the headrest 37 is at its most forward with respect to the seat back 36, the first revolving drive shaft 48 and the second revolving drive shaft 49 are in inner positions in the slots 51, 51. The actual advance X2 is at a maximum when the headrest 37 has advanced from the state shown in FIG. 5B to the state shown in FIG. 5D. The actual advance X2 is detected by the actual headrest advance detector 24 (see FIG. 4).

Figure 6:
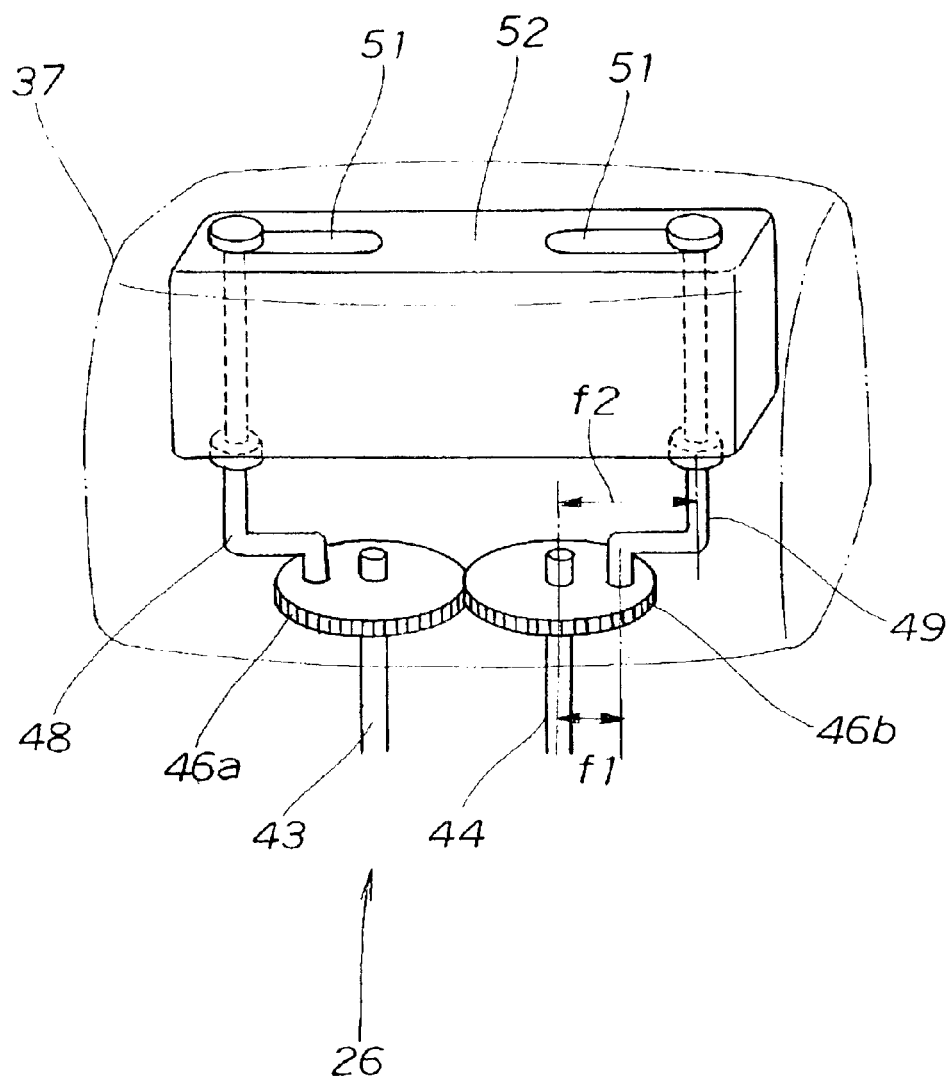
FIG. 6 is a view showing a variation of the headrest actuating mechanism shown in FIG. 3 and FIG. 4.

FIG. 6 shows an example of a variation of the headrest actuating mechanism 26, according to the invention. By forming the first revolving drive shaft 48 and the second revolving drive shaft 49 in the shape of a crank, the eccentricity from the centers of rotation of the gear wheels 46a, 46b to the first revolving drive shaft 48 and the second revolving drive shaft 49 is brought to f2. In this way, the eccentricity f2 is made larger than the eccentricity f1 at the base ends of the first revolving drive shaft 48 and the second revolving drive shaft 49. Correspondingly, the length of the slots 51, 51 can be set long. As a result, the actual advance of the headrest 37 increases.

FIG. 7A, FIG. 7B and FIG. 7C are action views of a vehicle occupant protection apparatus according to the invention.

FIG. 7A shows an occupant Ma seated in the seat 30. The headrest 37 is normally positioned at its rearmost, as shown with broken lines.

Figure 8A:
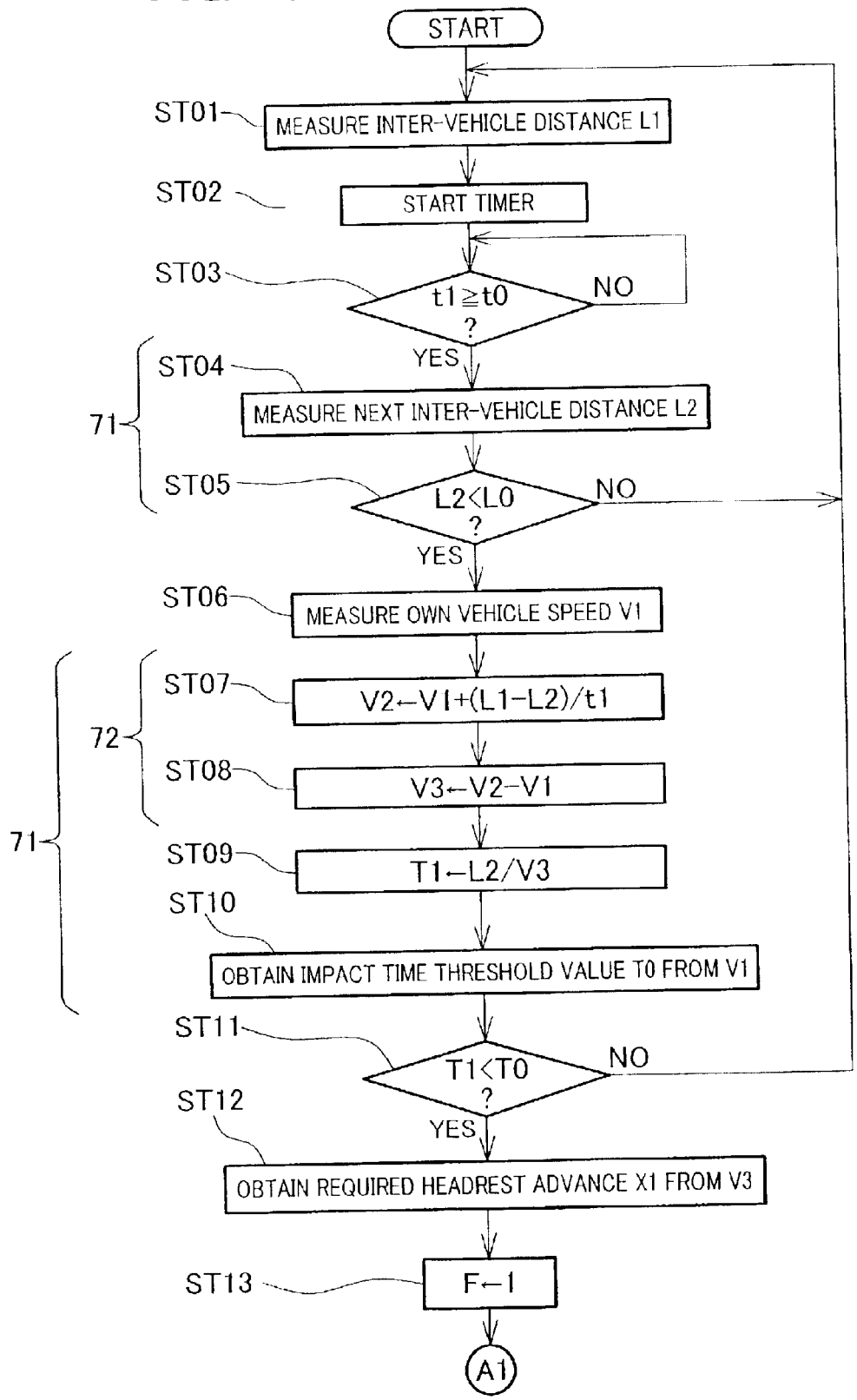
FIGS. 8A through 8C are flow charts of processing carried out by a headrest control unit according to the invention.

Then, when it is predicted by impact predicting means 71, which will be explained with respect to FIG. 8A, that an impacting body is about to impact the vehicle from behind (impact prediction), in correspondence with a prediction signal from the impact predicting means 71 a control signal is issued from the headrest control unit 25 to the headrest actuating mechanism 26 (see FIG. 2). And the headrest actuating mechanism 26 advances the headrest 37 to the position shown with solid lines.

In this way, at the impact prediction stage, the gap X11 between the headrest 37 and the head Hd of the occupant Ma can be made small. As a result, the so-called behind-the-neck gap between the headrest 37 and the neck Ne of the occupant Ma can be forcibly made small in advance. Because the gap behind the neck Ne is made small immediately before the rear-end collision, even when the upper body of the occupant Ma falls rearward as a reaction to the rear-end collision, the load acting on the neck Ne of the occupant Ma can be lightened more certainly.

As a result of the upper body of the occupant Ma falling backward as a reaction to an impact from behind, an external force acts on the seat back 36 from the upper body. This external force causes the seat back 36 to fall backward, as shown in FIG. 7B. In correspondence with the size of the backward external force, the seat back 36 deforms. The amount of this deformation can be detected with the seat back deformation detector 23. The gap between the headrest 37 and the head Hd of the occupant Ma at this time is X12.

In correspondence with a detection signal from the seat back deformation detector 23, as shown in FIG. 7C a control signal is issued from the headrest control unit 25 to the headrest actuating mechanism 26 (see FIG. 2). And the headrest actuating mechanism 26 advances the headrest 37 further from the position shown with broken lines to the position shown with solid lines.

In this way, the gap between the headrest 37 and the head Hd of the occupant Ma can be made zero or nearly zero. As a result, the gap behind the neck Ne can be forcibly made small in advance. Because the gap behind the neck Ne is made small immediately after the impact from behind, even when the upper body of the occupant Ma falls rearward as a reaction to the impact, the load acting on the neck Ne of the occupant Ma can be lightened more certainly.

Next, control carried out by the headrest control unit 25 shown in FIG. 2 will be explained, on the basis of the flow chart shown in FIG. 8A through FIG. 8C and with reference to the maps shown in FIG. 9 through FIG. 11.

Step (hereinafter abbreviated to ST) 01: The inter-vehicle distance L1 is measured. As the first inter-vehicle distance L1, the actual present inter-vehicle distance is measured by the inter-vehicle distance detector 21 of FIG. 1.

ST02: A timer built in to the headrest control unit 25 shown in FIG. 2 is reset and then started.

ST03: It is determined whether or not the count time t1 of the timer has reached a preset extremely small fixed time t0. This is repeated until the count time t1 has reached the time t0, whereupon processing proceeds to ST04.

ST04: The next inter-vehicle distance L2 is measured. As the next inter-vehicle distance L2, the actual present inter-vehicle distance is measured, as in ST01.

In this way, by ST01 through ST04, the inter-vehicle distance is measured twice and the change between inter-vehicle distances L1 and L2 over a fixed time t0 is obtained.

ST05: It is determined whether or not the next inter-vehicle distance L2 is below a preset maximum proximity value L0, and on YES processing proceeds to ST06 and on NO processing returns to ST01. This "maximum proximity value L0" is a first reference value for determining whether or not there is a possibility of the vehicle behind impacting the own vehicle.

ST06: The vehicle speed V1 of the own vehicle is measured. As the vehicle speed V1, the actual present vehicle speed V1 is measured by the own vehicle speed detector 22 shown in FIG. 2.

ST07: The vehicle speed V2 of the vehicle behind is measured. The vehicle speed V2 is a value obtained by subtracting the next inter-vehicle distance L2 from the first inter-vehicle distance L1, dividing this difference by the count time t1, and adding this quotient to the vehicle speed V1. That is, the vehicle speed V2 is obtained by computing "V2=V1+(L1−L2)/t1".

ST08: An estimated impact speed V3, i.e. a relative speed V3 of the vehicle behind with respect to the own vehicle speed V1, is calculated. The estimated impact speed V3 is the value obtained by subtracting the vehicle speed V1 of the own vehicle from the vehicle speed V2 of the vehicle behind. That is, the estimated impact speed V3 is obtained by computing "V3=V2−V1".

ST09: An estimated impact time T1, i.e. an estimated time T1 to the vehicle behind impacting the own vehicle, is obtained by calculation. The estimated impact time T1 is a value obtained by dividing the next inter-vehicle distance L2 by the estimated impact speed V3. That is, the estimated impact time T1 is obtained by computing "T1=L2/V3".

ST10: An impact time threshold value T0 is obtained from the own vehicle speed V1. Specifically, it is obtained on the basis of the map shown in FIG. 9.

Figure 9:
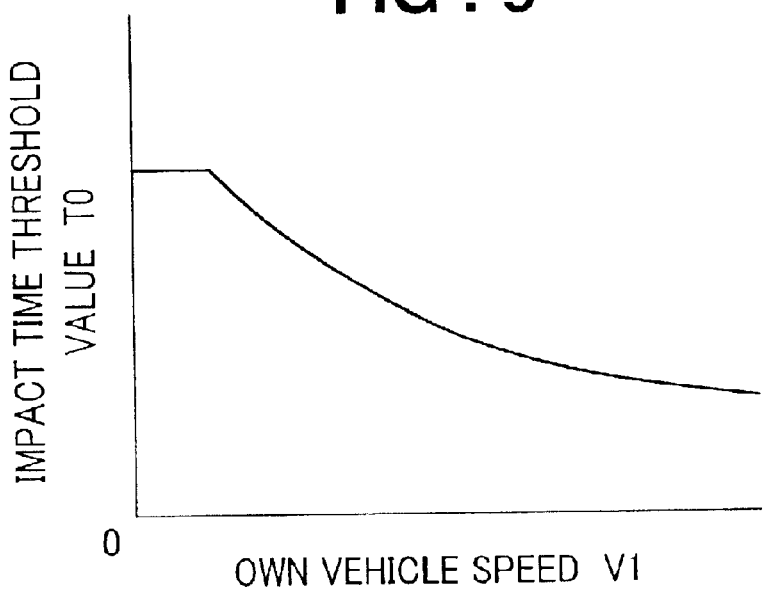
FIG. 9 is a map of impact time threshold value vs. own vehicle speed.
Figure 10:
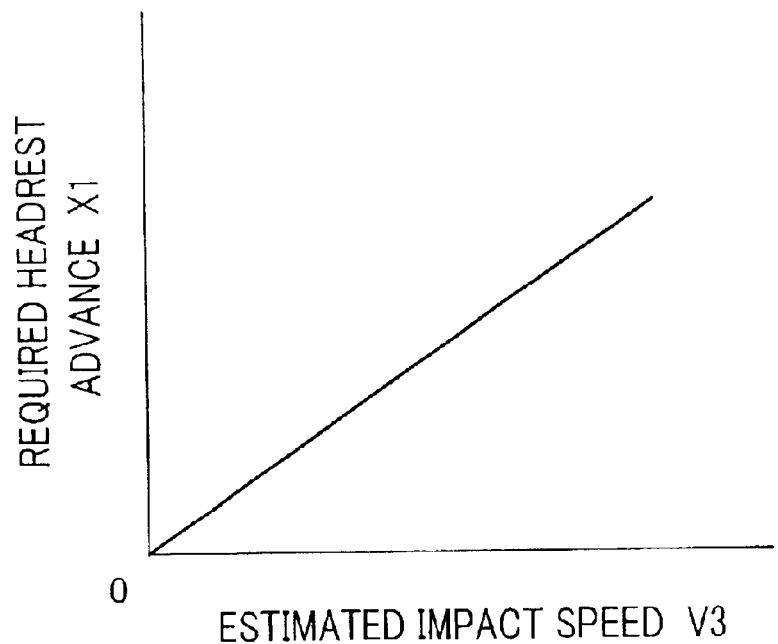
FIG. 10 is a map of required headrest advance vs. estimated impact speed.

FIG. 9 shows a map of impact time threshold values according to the invention. This map, with own vehicle speed V1 on the horizontal axis and impact time threshold value T0 on the vertical axis, is used to obtain an impact time threshold value T0 corresponding to the own vehicle speed V1.

From this map it can be seen that the impact time threshold value T0 maintains a high constant value when the vehicle speed V1 is close to 0, decreases in a rightwardly downward curve as the vehicle speed V1 increases, and substantially flattens out when the vehicle speed V1 increases further.

ST11: It is determined whether or not the estimated impact time T1 is below the impact time threshold value T0, and on YES processing proceeds to ST12 and on NO processing returns to ST01. Thus the "impact time threshold value T0" is a second reference value for determining whether or not there is a possibility of the vehicle behind impacting the own vehicle.

ST12: A required headrest advance X1 is obtained from the estimated impact speed V3. Specifically, it is obtained on the basis of the map shown in FIG. 12.

Figure 12:
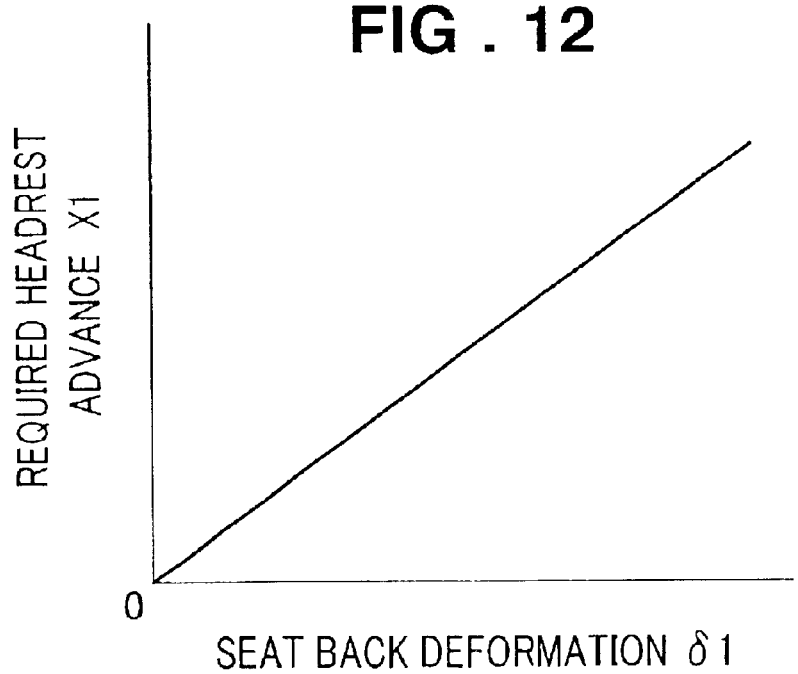
FIG. 12 is a map showing required headrest advance vs. seat back deformation at the time of a rear-end collision.
Figure 13:
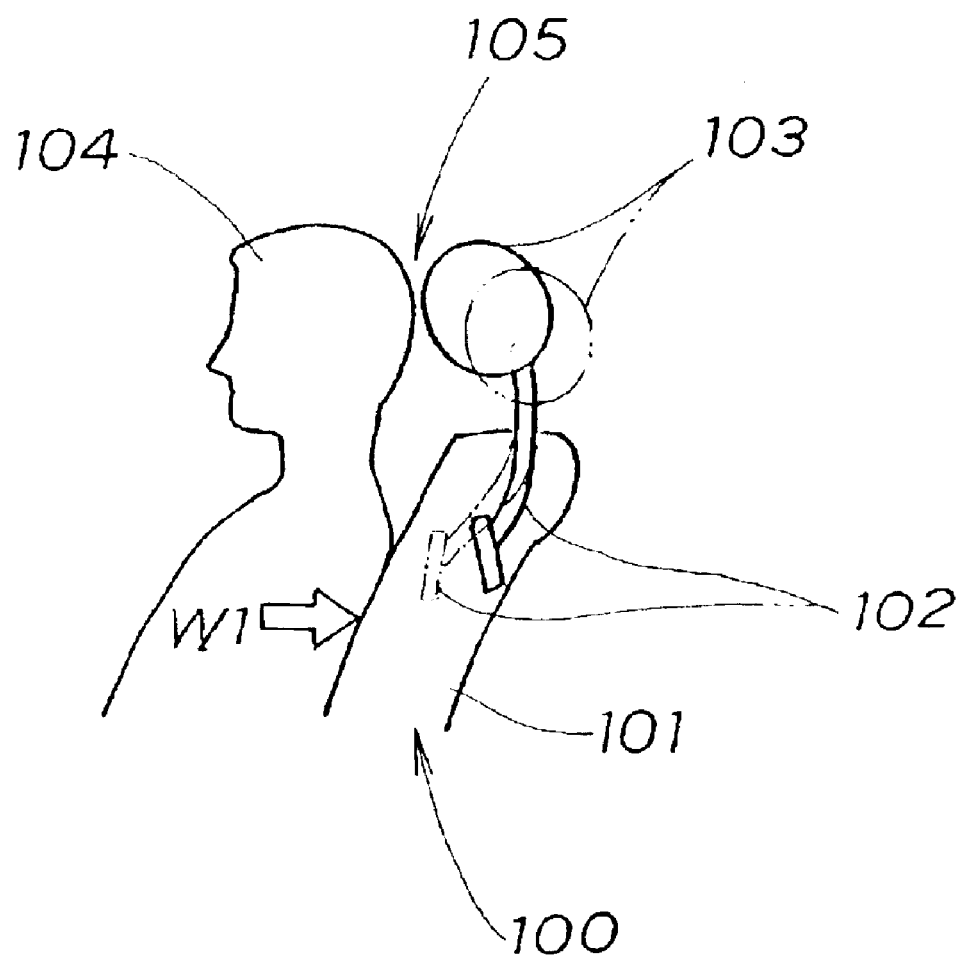
FIG. 13 is a schematic view of a vehicle occupant protection apparatus of related art, wherein a headrest is mounted swingably front/rearward by way of a swinging mechanism to the top of a seat back.
Figure 14A:
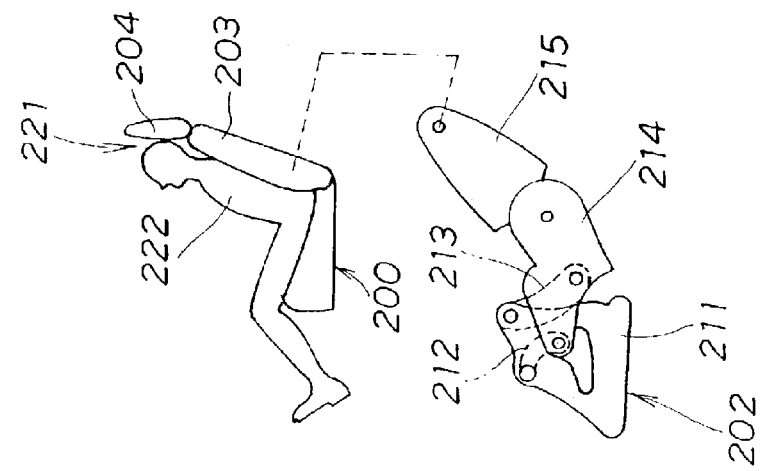
FIGS. 14A through 14C are schematic views of a vehicle occupant protection apparatus of related art showing an example wherein a seat back with a headrest mounted to the top thereof is mounted swingably front/rearward to a seat by a hinge mechanism.
Figure 14B:
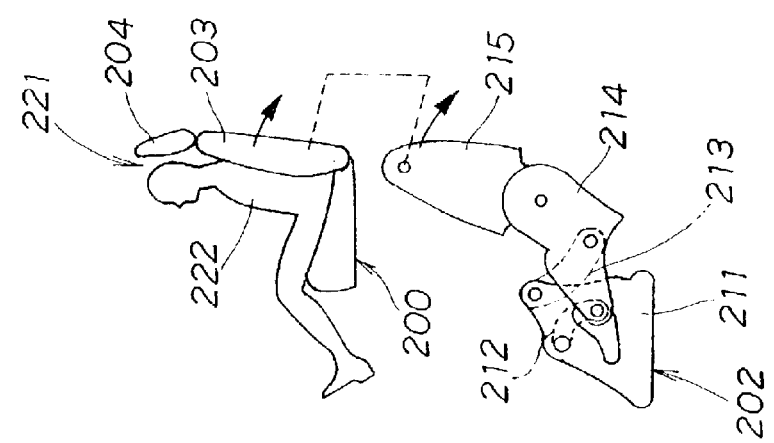
Figure 14C:
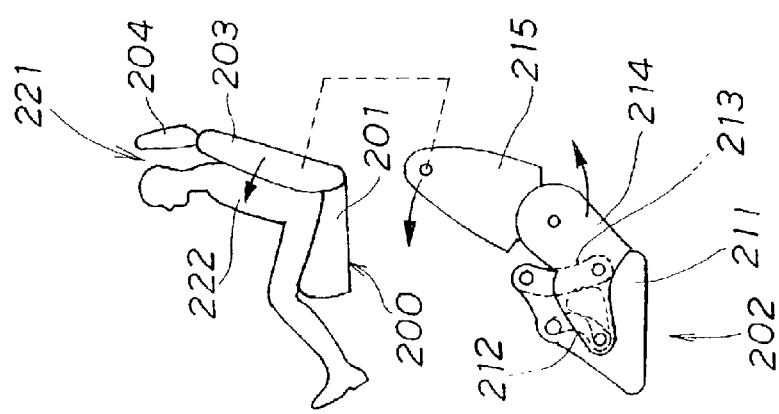

FIG. 12 is a map of required headrest advance according to the invention. This map, with estimated impact speed V3 on the horizontal axis and required headrest advance X1 on the vertical axis, is for obtaining a required headrest advance X1 corresponding to an estimated impact speed V3. In this map, the required headrest advance X1 is a value which is 0 when the estimated impact speed V3 is 0 and increases as the estimated impact speed V3 increases.

ST13: A flag F is set to 1.

Figure 8B:
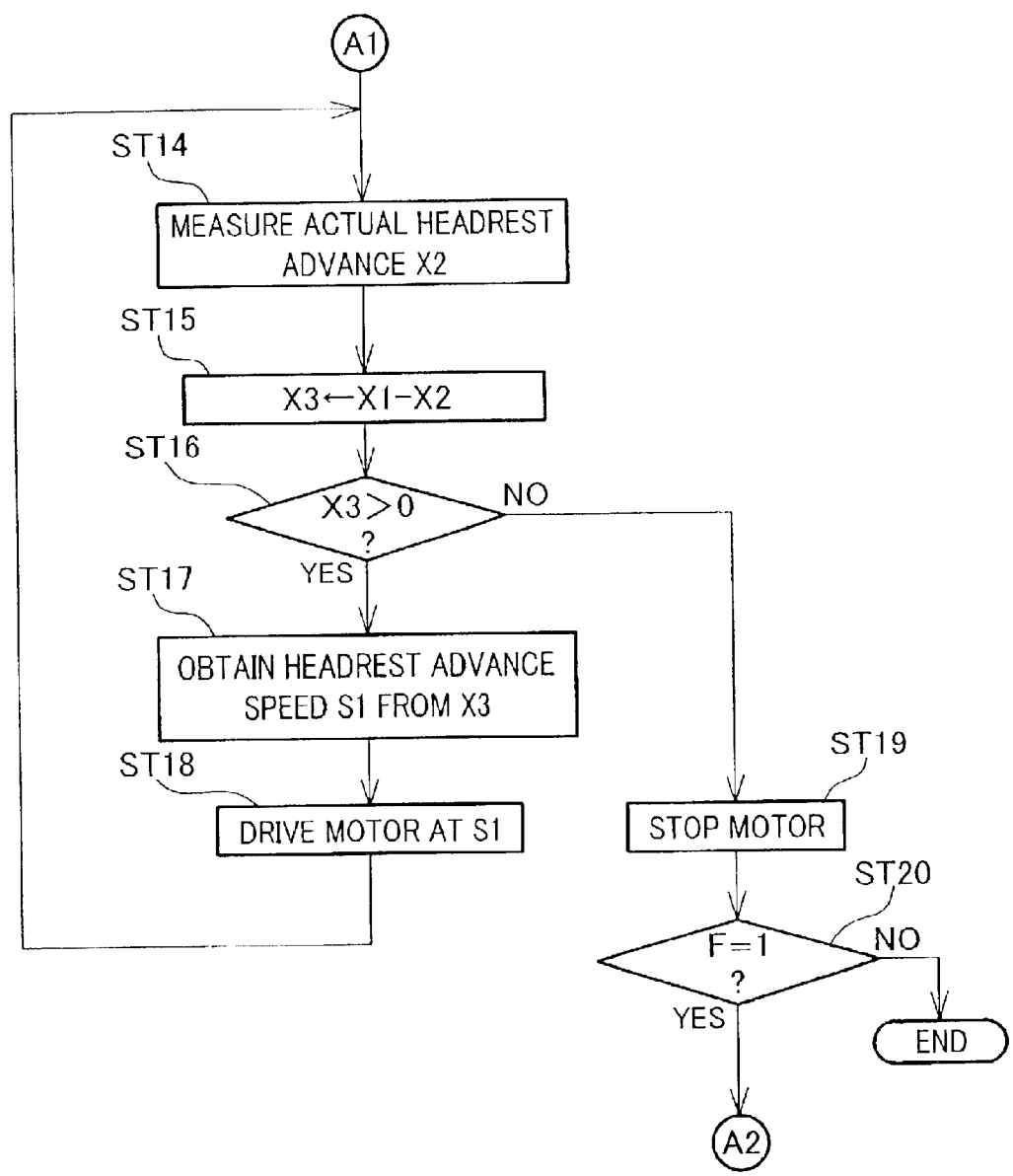

Referring now to FIG. 8B, ST14: The actual headrest advance X2 is measured. The actual advance X2 is measured by the actual headrest advance detector 24 of FIG. 4.

ST15: A remaining headrest advance X3 is obtained. The remaining headrest advance X3 is obtained by subtracting the actual advance X2 from the required headrest advance X1. That is, the remaining headrest advance X3 is obtained by computing "X3=X1−X2".

ST16: It is checked whether the remaining headrest advance X3 is greater than zero, i.e. whether there is some remaining headrest advance X3, and on YES processing proceeds to ST17 and on NO processing proceeds to ST19.

ST17: A headrest advance speed S is obtained from the remaining headrest advance X3. Specifically, it is obtained from the map shown in FIG. 11.

Figure 11:
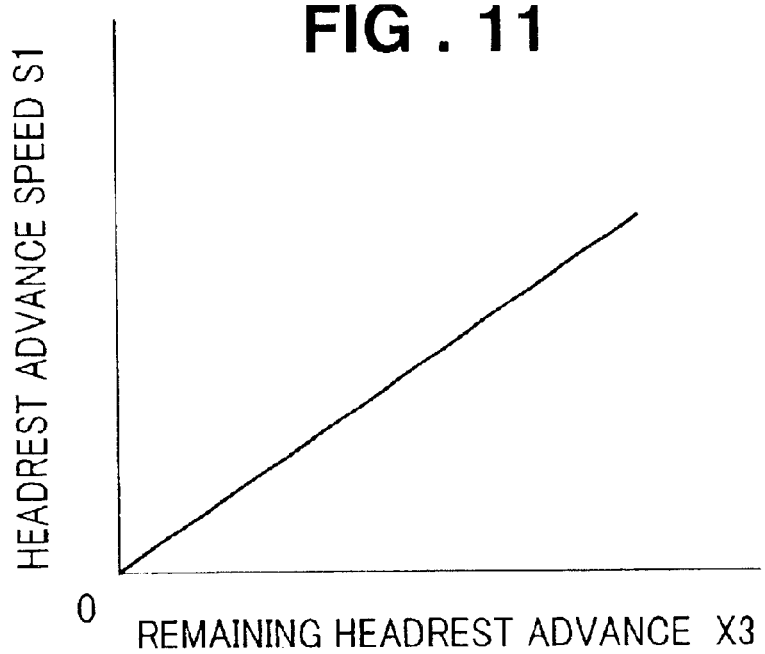
FIG. 11 is a map of headrest advance speed vs. remaining headrest advance.

FIG. 11 is a map of headrest advance speed according to the invention. This map, with remaining headrest advance X3 on the horizontal axis and headrest advance speed S5 on the vertical axis, is used to obtain a headrest advance speed S1 corresponding to the remaining headrest advance X3. In the map, the headrest advance speed S5 is a value which is 0 when the remaining headrest advance X3 is 0 and increases as the remaining headrest advance X3 increases.

ST18: The speed of the motor of the headrest advancing part is determined so that the headrest advance speed becomes S1, the motor is driven at this speed, and processing returns to ST21.

ST19: The motor of the headrest advancing part is stopped.

ST20: It is checked whether or not the flag F is 1, and if YES then processing proceeds to ST21 in FIG. 8C and if NO then processing ends.

Thus in ST14 through ST18, the headrest is advanced by a required advance X1 corresponding to the estimated impact speed V3 (see FIG. 8A) by he motor. After that, in ST19 the motor is stopped. In ST20, when F=1, headrest advance control based on the estimated impact speed V3 is ended, and headrest advance control based on deformation of the seat back, shown in FIG. 8C, begins.

Figure 8C:
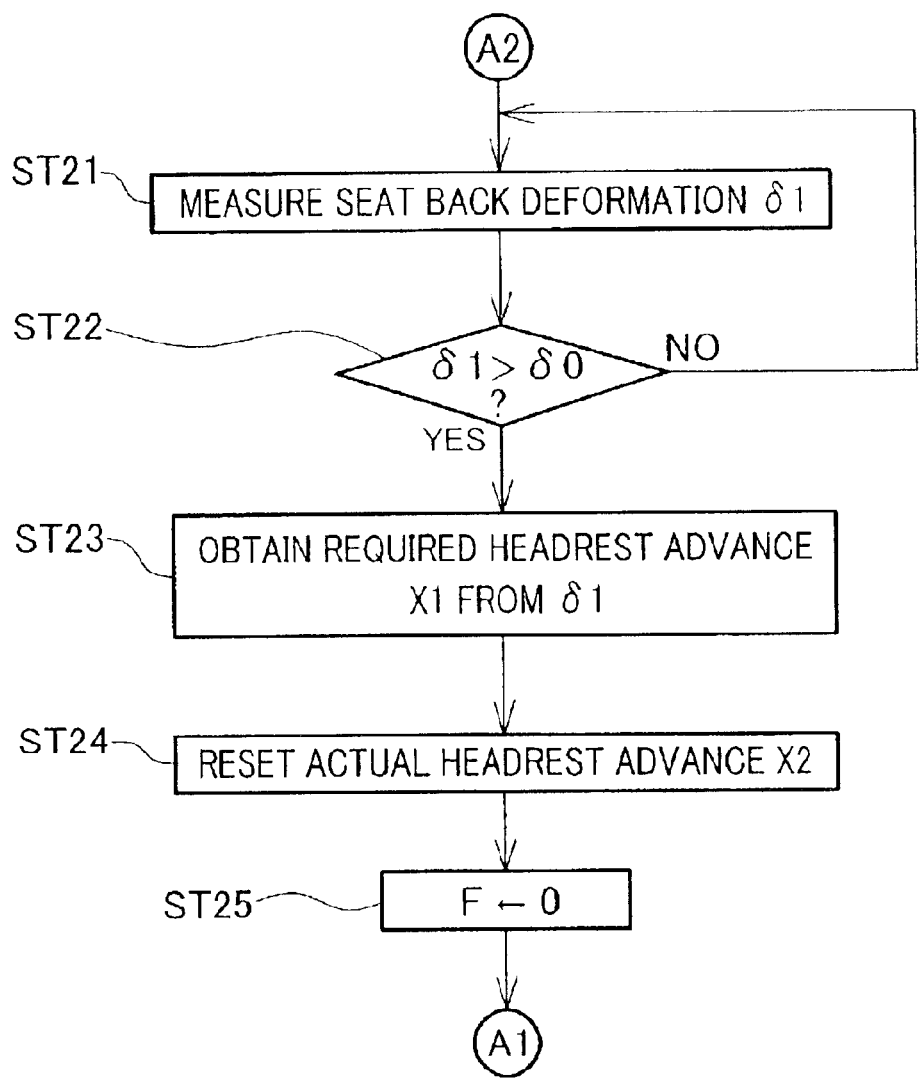

Referring now to FIG. 8C, ST21: A seat back deformation δ1 is measured. As the seat back deformation δ1, the actual present seat back deformation δ1 is measured by the seat back deformation detector 23 (see FIG. 3).

ST22: It is determined whether or not the seat back deformation δ1 is greater than a lower limit threshold value δ0 (δ1>δ0), and on YES processing proceeds to ST23 and on NO processing returns to ST21. The "lower limit threshold value δ0" is a reference value for determining whether or not there has been an impact from behind. If δ1>δ0, it is determined that there has been an impact.

ST23: A required headrest advance X1 is obtained from the seat back deformation δ1. Specifically, it is obtained from the map shown in FIG. 12.

FIG. 12 is a map of required headrest advance according to the invention. This map, with seat back deformation δ1 on the horizontal axis and required headrest advance X1 on the vertical axis, is used to obtain a required headrest advance X1 corresponding to the seat back deformation δ1. In the map, the required headrest advance X1 is a value which is 0 when the deformation δ1 is 0 and increases as the deformation δ1 increases.

ST24: The actual advance X2 of the headrest is reset (X2=0).

ST25: The flag F is set to 0 and processing proceeds to ST14 of FIG. 8B.

Summarizing the foregoing explanation with reference to FIG. 1 through FIG. 3, a vehicle occupant protection apparatus 20 is made up of a headrest 37 mounted movably front/rearward to the top of a seat 30, a headrest actuating mechanism 26 for advancing the headrest 37, impact predicting means 71 (see FIG. 8A) for predicting an impact from behind, and a headrest control unit 25 for issuing a control signal to the headrest actuating mechanism 26 to advance the headrest 37 in correspondence with a prediction signal from the impact predicting means 71.

The headrest control unit 25 includes the impact predicting means 71 and relative speed detecting means 72 (see FIG. 8A) provided in the impact predicting means 71. That is, the steps ST04, ST05 and ST07 through ST11 constitute the impact predicting means 71. And the steps ST07 and ST08 constitute the relative speed detecting means 72.

Also, the headrest control unit 25 has means (steps ST12 through ST20) for issuing a control signal to the headrest actuating mechanism 26 to increase the advance of the headrest 37 in correspondence with a detection signal from the relative speed detecting means 72.

When the impact predicting means 71 predicts an impact, the required headrest advance X1 of the headrest 37 is made to change more suitably in correspondence with the relative speed V3 of the vehicle behind (impacting body) 12 with respect to the own vehicle 11.

When the own vehicle is impacted from behind, as a reaction to that the upper body of the occupant tends to fall backward. This amount of this falling backward is greater the greater is the relative speed V3. With respect to this, in this invention, the required headrest advance X1 of the headrest 37 is increased the greater is the relative speed V3, and the behind-the-neck gap can be made smaller immediately before an impact from behind. Therefore, even when as a reaction to suffering a rear-end collision the upper body of the occupant falls rearward, the load acting on the neck of the occupant can be lightened more rapidly and certainly.

Also, the headrest control unit 25 is constructed to issue a control signal to the headrest actuating mechanism 26 to increase the advance of the headrest 37 in correspondence with a detection signal from the seat back deformation detector 23 (see steps ST21 through ST25, ST14 through ST20 and the map of FIG. 12).

When the own vehicle is impacted from behind, as a reaction to that the upper body and the head of the occupant fall backward. Because the upper body is supported by the seat back 36, the amount by which it falls is relatively small. However, immediately before the impact the head is away from the headrest 37. Consequently, the amount by which the head falls is greater than the amount by which the upper body falls. This tendency is more marked the greater is the impact energy.

As a result of the upper body of the occupant falling rearward as a reaction to the impact from behind, an external force acts on the seat back 36 from the upper body. In correspondence with this external force the seat back 36 deforms. The greater is the impact energy the greater is the external force, and consequently the greater is the deformation 61 of the seat back 36. In this invention, the greater is the deformation δ1, the more the required headrest advance X1 of the headrest 37 is increased. Because of this, the behind-the-neck gap can be made smaller at the time of the impact. Consequently, when the upper body of the occupant falls rearward as a reaction to an impact, the load acting on the neck of the occupant can be lightened more rapidly and certainly.

And, the headrest control unit 25 is constructed to issue a control signal to the headrest actuating mechanism 26 to reduce the headrest advance speed S1 of the headrest 37 as the actual advance X2 detected by the actual headrest advance detector 24 increases (see steps ST15, ST17, ST18 and the map of FIG. 11).

As the headrest 37 advances, the behind-the-neck gap becomes smaller. With respect to this, the headrest 37 slows as it moves forward. And accordingly, even if the advancing headrest 37 hits the neck, the load which acts on the neck is extremely slight and essentially has no effect.

The vehicle occupant protection apparatus 20 of this invention can be applied whether the own vehicle 11 is stopped or moving.

Although in the preferred embodiment described above the rear impact predicting means 71 and the relative speed detecting means 72 were made functions of the headrest control unit 25, alternatively they may be provided separately from the control unit 25.

Also, the actual headrest advance detector 24 is not limited to the photoelectric rotary encoder made up of the pulse disc 61 and the sensor 62 shown in FIG. 4. For example, alternatively the motor 41 may be made a stepping motor incorporating a rotary encoder.

The present disclosure relates to the subject matter of Japanese Patent Application No. 2002-166083, filed Jun. 6, 2002, the disclosure of which is expressly incorporated herein by reference in its entirety.

What is claimed is:

1. A vehicle occupant protection apparatus, comprising:
   a headrest mounted movably front/rearward to the top of a seat of a vehicle;
   a headrest actuating mechanism for advancing the headrest; and a headrest control unit for drive-controlling the headrest actuating mechanism, the headrest control unit including a means for predicting an impact from an impacting body into the vehicle from behind and a means for drive-controlling the headrest actuating mechanism provided by a prediction signal from the means for predicting an impact, and wherein the headrest control unit responds to the prediction signal from the means for predicting an impact by controlling the headrest actuating mechanism before a rear-end impact occurs, such that the headrest advances forward by a first required amount determined by a first map defined by an estimated impact speed calculated from an inter-vehicle distance and the vehicle speed, said first required amount defining a gap between the headrest and head of the vehicle occupant, whereby when the rear-end impact occurs, the headrest advances by a second required amount determined by a second map defined by an amount of deformation of a seat back of the seat resulting from a backward falling of the vehicle occupant against the seat back as a reaction of the rear-end impact.

2. The protection apparatus according to claim 1, wherein the means for predicting an impact including a means for detecting the relative speed of the impacting body with respect to the vehicle, whereby the headrest control unit controls the headrest actuating mechanism to increase the advance of the headrest corresponding with an increase in relative speed of the impacting body.

3. The protection apparatus according to claim 1, wherein the headrest actuating mechanism including an actual headrest advance detector for detecting an actual headrest advance, whereby the headrest control unit controls the headrest actuating mechanism to reduce the speed of advance of the headrest when the actual advance detected by the actual headrest advance detector increases.

* * * * *